United States Patent
Aoki (10) Patent No.: US 7,286,109 B2
(45) Date of Patent: Oct. 23, 2007

(54) ACTIVE MATRIX TYPE DISPLAY APPARATUS

(75) Inventor: Yoshiro Aoki, Saitama-Ken (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 703 days.

(21) Appl. No.: 10/846,550

(22) Filed: May 17, 2004

(65) Prior Publication Data

US 2005/0007307 A1 Jan. 13, 2005

(30) Foreign Application Priority Data

May 16, 2003 (JP) .............................. 2003-139441

(51) Int. Cl.
*G09G 3/36* (2006.01)

(52) U.S. Cl. .......................... 345/94; 345/98; 345/100; 345/208; 315/169.3

(58) Field of Classification Search ................. 345/92, 345/94, 98, 100, 103, 208; 315/169.3
See application file for complete search history.

(56) References Cited

U.S. PATENT DOCUMENTS

| | | | |
|---|---|---|---|
| 6,448,954 B1* | 9/2002 | Katoh et al. ................. | 345/100 |
| 2002/0154089 A1* | 10/2002 | Yamazaki et al. .......... | 345/103 |
| 2003/0164685 A1* | 9/2003 | Inukai ....................... | 315/169.3 |
| 2003/0197673 A1* | 10/2003 | Nakamura ................... | 345/99 |

* cited by examiner

*Primary Examiner*—Bipin Shalwala
*Assistant Examiner*—Vincent E. Kovalick
(74) *Attorney, Agent, or Firm*—Oblon, Spivak, McClelland, Maier & Neustadt, P.C.

(57) ABSTRACT

Buffer circuits are provided between outputs of a scanning line driver circuit and scanning lines. The buffer circuits each are configured to make rise or fall time of scanning signals at output sides of the buffer circuits substantially the same as or longer than those of the scanning signals at end terminals of the scanning lines when the scanning signals supplied to the scanning lines are rectangular in waveform.

6 Claims, 13 Drawing Sheets

FIG. 7A INPUT(1)

FIG. 7B OUTPUT

FIG. 7C INPUT(2)

FIG. 7D INPUT(3)

ACTIVE MATRIX TYPE DISPLAY APPARATUS

FIELD OF THE INVENTION

This invention generally relates to an active matrix type display device and, more particularly, to an active matrix type display device using an organic electroluminescence device, for instance.

This application is based upon and claims the benefit of priority from the prior Japanese Patent Application No. 2003-139441 filed on May 16, 2003, the entire contents of which are incorporated in this application by reference.

BACKGROUND OF THE INVENTION

Organic electroluminescence (EL) display apparatus have recently attracted a great deal of attention. Pixels in the display apparatus contain light-emitting devices, i.e., organic EL display elements with thin-film solid-state stacked structures but the display apparatus are not required to have light sources such as rear or front light sources in contrast with liquid crystal display apparatus necessarily provided with them. Thus, the display apparatus are lighter in weight, thinner in thickness and stronger against mechanical shocks than the liquid crystal display apparatus.

The EL display elements are driven by driver transistors of pixel circuits, the gate electrodes of which are supplied with video signals. In other words, electric currents corresponding to the video signals are provided for the EL display elements to emit light with brightness in response to such electric currents.

Voltages at the gate electrodes of the driver transistors are provided by using a voltage or current signal supply system. The voltage-signal supply (or voltage writing) and current-signal supply (or current writing) methods are disclosed in U.S. Pat. Nos. 6,229,506B1 and 6,373,454B1, respectively.

In the pixel circuits, switching transistors are provided to supply voltages to the gate electrodes of the driving transistors. Thus, the gate voltages are controlled for a one frame period, for instance, in response to switching states of the switching transistors. Since the switching transistors turn on or off, the gate voltages are not always set to be accurate, i.e., they do not necessarily correspond to video signals precisely. One of the causes of this effect is "a feed-through (or punch-through) voltage" of the switching transistors, which is influenced by response characteristics of the switching transistors. As the gate voltages fluctuate, output current of the driver transistors also varies so that the display elements cannot always display uniform brightness in accordance with the video signal.

Meanwhile, the applicant has noticed another possible cause of the uneven brightness from the following view point. When a scanning signal is supplied to the switching transistors from the driver circuit though a scanning line, the scanning signal at an output point of the driver circuit is different in waveform from those at middle points of the scanning line (wiring) and an end terminal of the wiring, respectively. This results from the fact that time constant circuits equivalent to the respective pixel portions are different from each other. In other words, the "feed-through (or punch-through) voltage" at the output point of the driver circuit is different in amplitude from those at the middle points of the wiring and the end terminal of the wiring, respectively, to bring about uneven brightness (or uneven display) on a screen.

SUMMARY OF THE INVENTION

Accordingly, the present invention provides an active matrix type display apparatus to make scanning signal waveforms substantially the same in each part of a given scanning line.

One aspect of the present invention is directed to an active matrix type display apparatus provided with a pixel arrangement region including scanning lines and signal lines crossing the scanning lines at substantially right angles, pixels disposed at vicinities of crossing points of the scanning lines and said signal lines, a scanning line driving circuit for supplying scanning signals to the scanning lines, a signal line driver circuit for supplying signals to the signal lines, and buffer circuits provided between the scanning lines and the scanning line driver circuits. Time constants of the buffer circuits each are set to make rise or fall time of the scanning signals at output sides of the buffer circuits substantially the same as or longer than that of the scanning signals at end terminals of the scanning lines connected to the buffer circuits.

BRIEF DESCRIPTION OF THE DRAWINGS

A more complete appreciation of the present invention and many of its attendant advantages will be readily obtained as the same becomes better understood by reference to the following detailed descriptions when considered in connection with the accompanying drawings, wherein.

DESCRIPTION OF THE PREFERRED EMBODIMENTS

Embodiments of the present invention will be explained below with reference to the attached drawings. It should be noted that the present invention is not limited to the embodiments but covers their equivalents. Throughout the attached drawings, similar or same reference numerals show similar, equivalent or same components.

Figure 1:
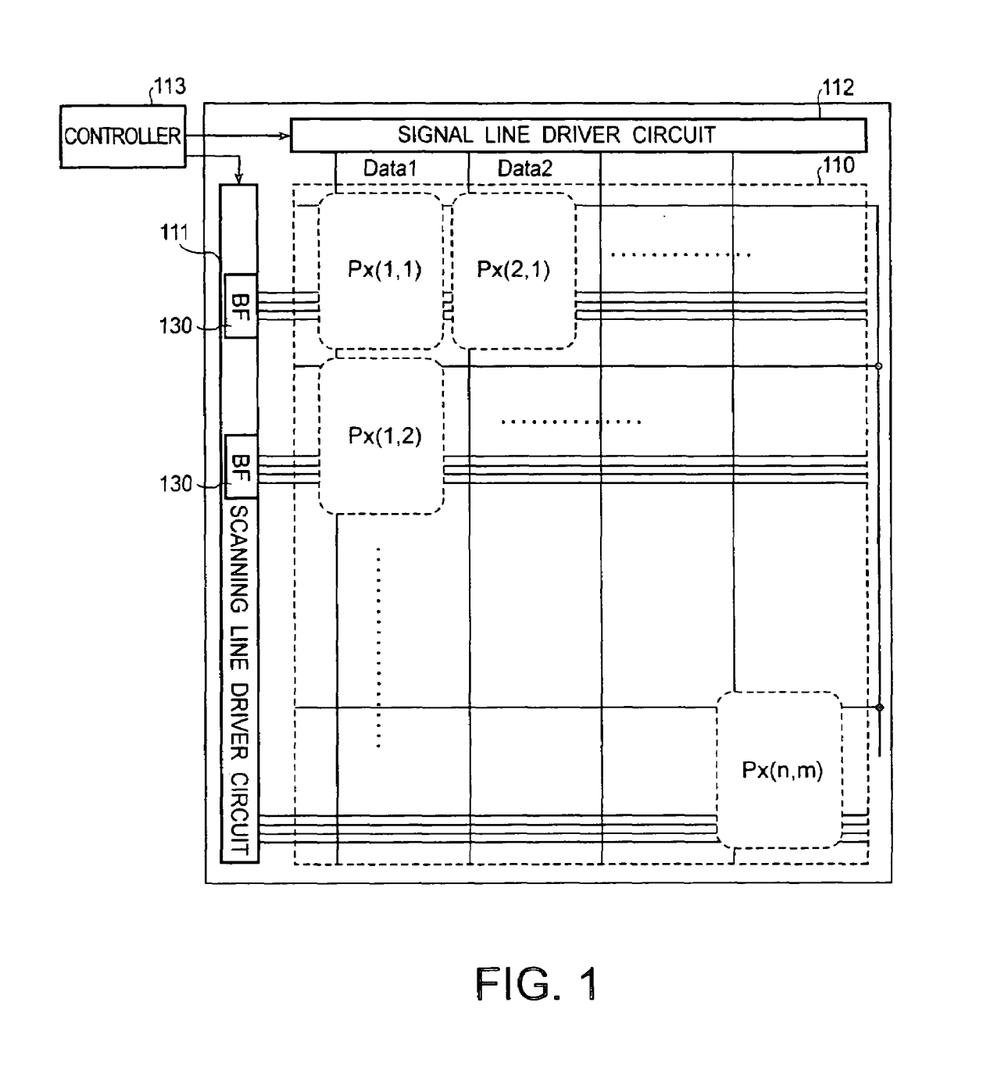
FIG. 1 is a block diagram of an active matrix type display apparatus according to the present invention.

FIG. 1 is a block diagram an organic EL display apparatus according to the present invention.

The organic EL display apparatus is provided with pixel arrangement region 110 of a display panel, scanning and signal line driver circuits 111 and 112 to drive the display panel, and a controller 113 to control the driver circuits 111 and 112.

Pixel arrangement region 110 is formed on a transparent isolation substrate (not shown) such as a glass plate. In pixel arrangement region 110, pixels Px (1, 1), Px (2, 1), ., and Px (n, m) are disposed in columns and rows of a matrix.

Scanning line driver circuit 111 and signal line driver circuit 112 are formed in outer circumferential regions of pixel arrangement region 110 on the substrate. Since scanning line driver circuit 111 includes a shift register and buffer circuits 130, a horizontal start pulse is transferred to a next stage of the shift register at every time when a pulse is supplied to the shift register from an outer circuit and each stage of the shift register outputs a scanning signal to a corresponding scanning line through buffer circuit 130 connected to the stage. Thus, pixels Px (1, 1), Px (2, 1), . . . , and Px (n, m) are sequentially scanned at every row so that data input and holding states of pixels Px (1, 1), Px (2, 1), . . . , and Px (n, m) are set. Signal line driver circuit 112 outputs writing signals to signal lines Data 1, Data 2, . . . , Data n disposed in columns.

Controller 113 is usually formed on a driver circuit substrate provided separately from the element array substrate and outputs data signals, various timing signals (for signal read-in and read-out timings, etc.) and clock signals.

Figure 2:
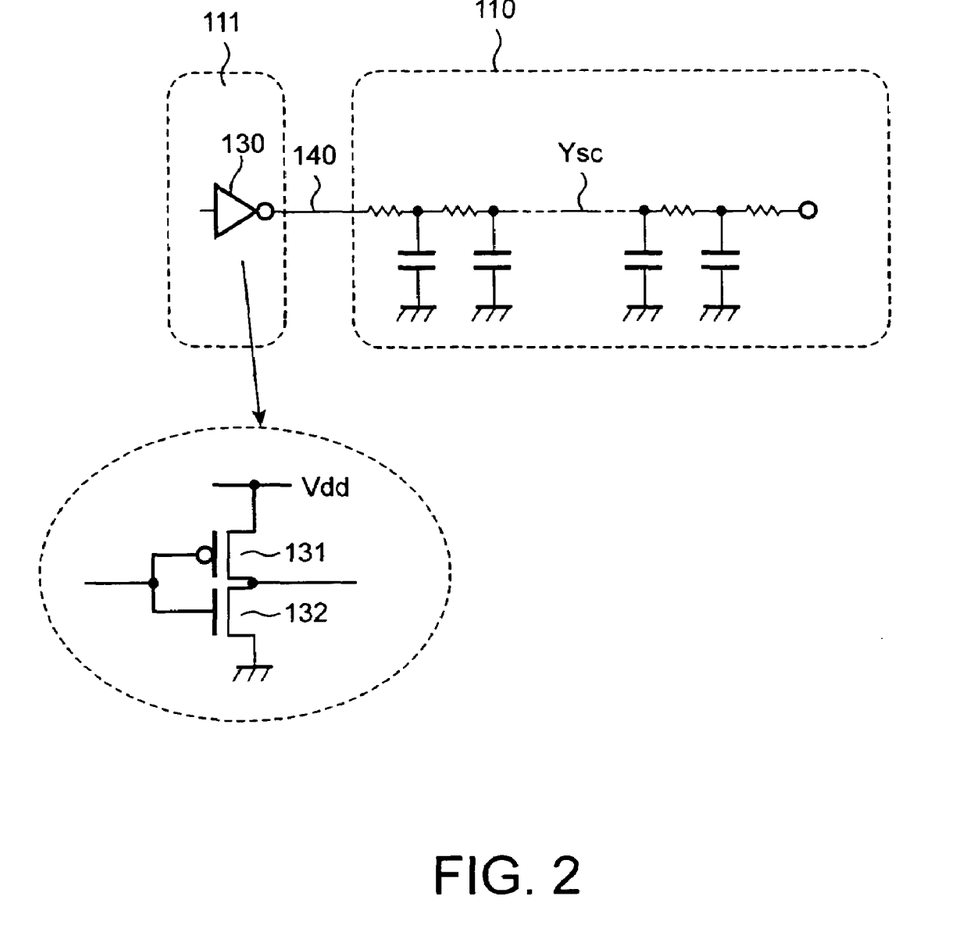
FIG. 2 is a circuit diagram of the first embodiment of a buffer circuit in the scanning line driver circuit and an equivalent circuit of the pixel arrangement region of the active matrix type display apparatus shown in FIG. 1.

FIG. 2 shows a connecting state of scanning line Ysc. When a scanning signal supplied to scanning line Ysc changes from a low level to a high level, switching transistors (not shown) of given pixels are transferred from a turned-on state to a turned-off state, for instance, so that the pixels are also transferred from a data receiving state to a data holding state.

Scanning line driver circuit 111 is provided with buffer circuit 130 in its output stage through which scanning signals are supplied to corresponding scanning lines. Pixel arrangement region 110 is provided for image display and an equivalent circuit of scanning line Ysc in the pixel arrangement region is shown in FIG. 2. Scanning Ysc in pixel arrangement region 110 can be described as series connections of time-constant circuits, each of which consists of a resistor and a capacitor. Buffer circuit 130 consists of a series connection circuit of thin film transistors (TFTs) with different types of conductivities such as p-channel TFT 131 and n-channel TFT 132.

Figures 3A, 3B, 3C:
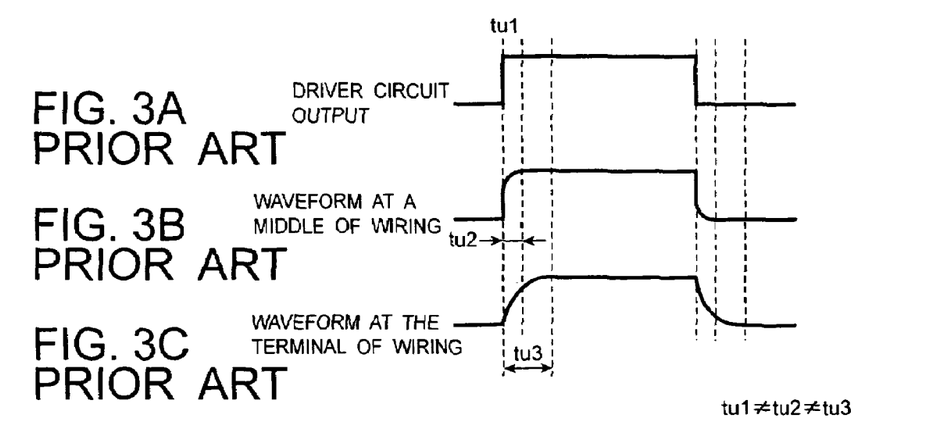
FIGS. 3A through 3F are timing charts to explain operations of the circuits shown in FIG. 2.

When a rectangular output signal of buffer circuit 130 is applied to input terminal 140 and if a rise time of the output signal is shorter than a time constant of RC circuit of wiring (scanning line) Ysc, waveforms at the output of the scanning line driver circuit, a middle of the wiring Ysc, and the end terminal of the wiring Ysc become those shown in FIGS. 3A, 3B and 3C, respectively. The waveform at a location near the output of the scanning line driver circuit is rectangular but that in the middle of the wiring is distorted in its rise and fall edges. Since the end terminal of the wiring Ysc is the farthest from the scanning line driver circuit, both rise and fall of the waveform at the end terminal are deformed the most. Thus, when switching transistors in a scanning line (row) direction of the pixels are driven with those waveforms of the output, the feed-through (or punch-through) voltages vary at locations of wiring Ysc. As a result, it causes uneven brightness in the scanning line direction.

To solve that problem, channel lengths or channel widths of TFTs in buffer circuits of the present invention are adjusted for waveforms of scanning signals not to be significantly distorted in each scanning line.

Figures 3D, 3E:
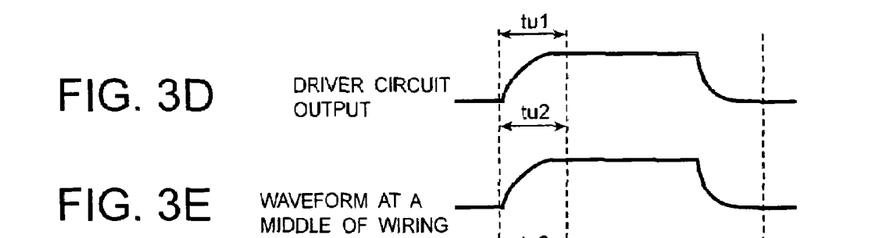
Figure 3F:
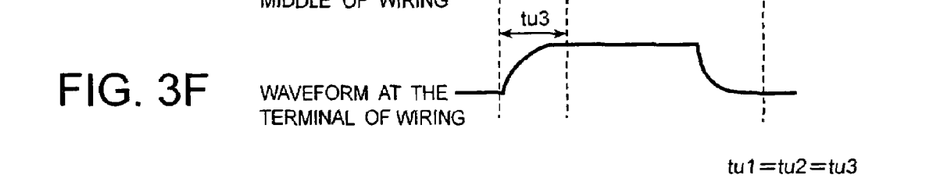

FIGS. 3D, 3E and 3F show such adjusted waveforms of a scanning signal at a location near the scanning line driver circuit, a middle point of the wiring and the end terminal of wiring Ysc. As seen from the drawings, the waveforms at those locations are set to be substantially the same. That is, both rise time and fall time in an output waveform of the scanning signal from buffer circuit 130 are designed to be longer than the time constant of wiring Ysc. The rise time ordinarily means time taken by the waveform of the scanning signal to shift from its minimum level to its maximum level. Likewise, the fall time also ordinarily means time taken by the waveform of the scanning signal to shift from its maximum level to its minimum level. Such design results in substantially the same waveforms despite the locations of the wiring. Since the rise time of tu1, tu2 and tu3, in particular this embodiment, is made substantially equal, i.e., tu1=tu2=tu3, the amplitude of the feed-through (or punch-through) voltages is substantially the same at the pixels connected to scanning line Ysc and no large dispersion takes place. It means that uneven brightness (or uneven display) is not caused by the feed-through (or punch-through) voltages. The maximum and minimum potentials are used for the explanation of the same waveforms of the scanning signal at the locations of the scanning line. It is important that, when the switching transistor at the pixel shifts from its turned-on state to its turned-off state, transient time from initial state to its turned-off state for the switching transistor at the pixel near buffer circuit 130 is substantially equal to that for the switching transistor at the pixel at the end terminal of the scanning line. That is, transient time for the switching transistor at the pixel near buffer circuit 130 to take from its turned-on state to its turned-off state in response to the scanning signal from buffer circuit 130 is substantially equal to that for the switching transistor at the pixel at the end terminal of the scanning line to take from its turned-on state to its turned-off state in response to the scanning signal. Further, it is also desirable to make another transient time for the switching circuit of a pixel near buffer circuit 130 to take from the turned-off state to the turned-on state in response to the scanning signal substantially the same as that for the switching circuit of the pixel at the end terminal of the scanning line to take from the turned-off state to the turned-on state in response to the scanning signal.

Further, buffer circuit 130 is not limited to the present embodiment in which p-channel transistor 131 and n-channel transistor 132 are connected in series. Buffer circuit 130 may be such other circuits to turn off the switching transistors in the pixel at a rise of the scanning signal. For instance, the drain electrode of p-channel transistor 131 is directly connected to a reference potential so that n-channel transistor 132 can be eliminated from buffer circuit 130.

Figure 4:
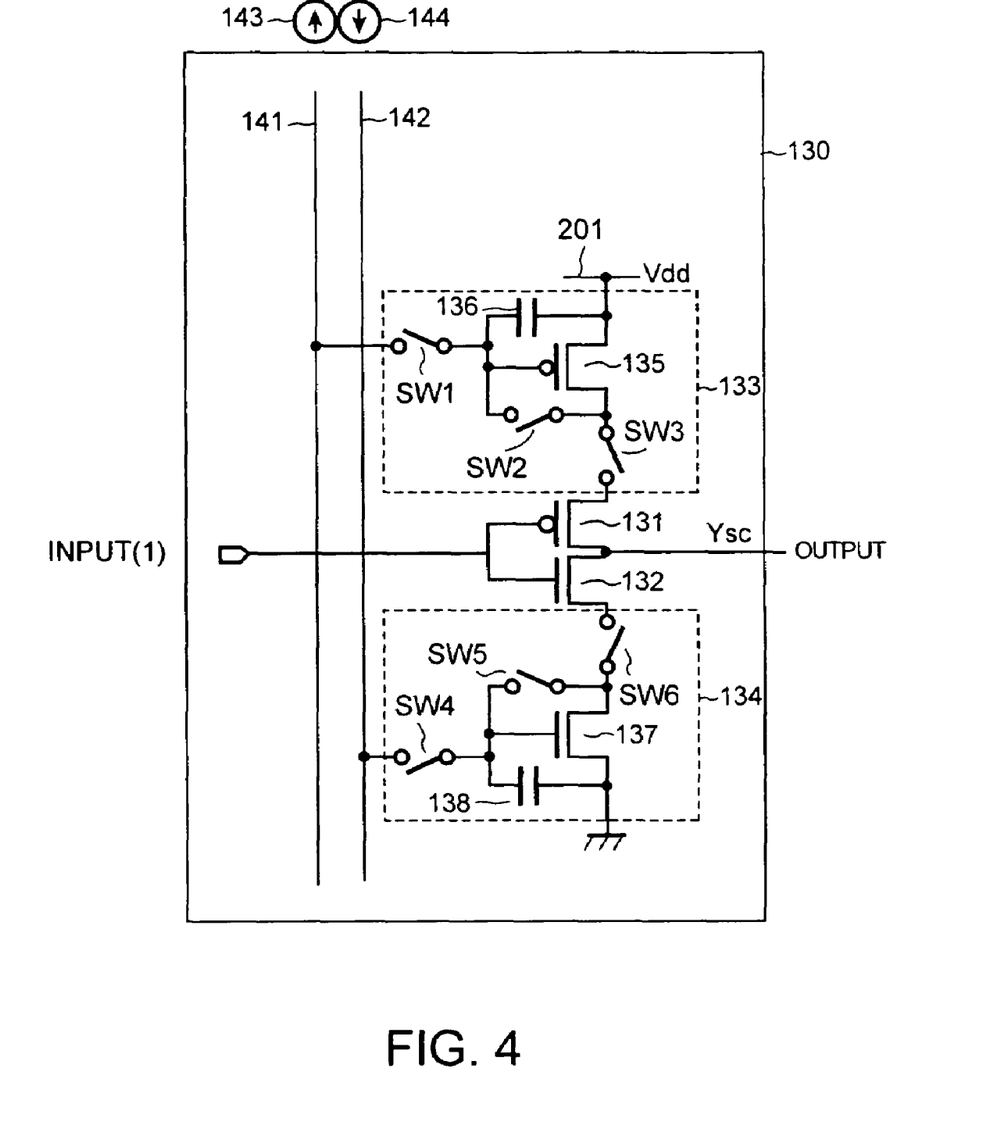
FIG. 4 is a circuit diagram of the second embodiment of the buffer circuits shown in FIG. 2.

FIG. 4 is a circuit diagram of the second embodiment of buffer circuit 130. The circuit forms more precise waveforms of the scanning signal on scanning line Ysc. The source electrode of p-channel transistor 131 is connected to constant current line 141 through constant current source 133. The drain electrode of n-channel transistor 132 is connected to constant current line 142 through constant current source 134. Constant current source 133 is provided with p-channel transistor 135 and the source electrode of p-channel transistor 135 is connected to voltage supply line 201. Capacitor 136 is connected between the gate and source electrodes of transistor 135. The gate electrode of transistor 135 is connected to constant current line 141 through switch SW1, switch SW2 is connected between the gate and drain electrodes of transistor 135, and the drain electrode is connected to the source electrode of transistor 131 through switch SW3. Constant current source 134 includes n-channel transistor 137, the source electrode of which is connected to a reference potential. Capacitor 138 is connected between the gate and source electrodes of transistor 137. The gate electrode of transistor 137 is connected to constant current line 142 through switch SW4, switch SW5 is connected between the gate and drain electrodes of transistor 137, and the source electrode is connected to the drain electrode of transistor 132 through switch SW6.

Since there are various types of transistors to implement the present invention, source and drain electrodes of the transistors may be called first and second electrodes, respectively, while gate electrodes may also be called control electrodes.

Figure 5A:
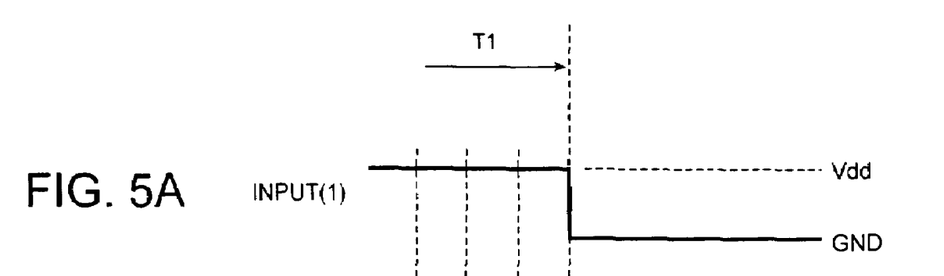
FIGS. 5A through 5F are timing charts to explain operations of the circuits shown in FIG. 4.
Figure 5B:
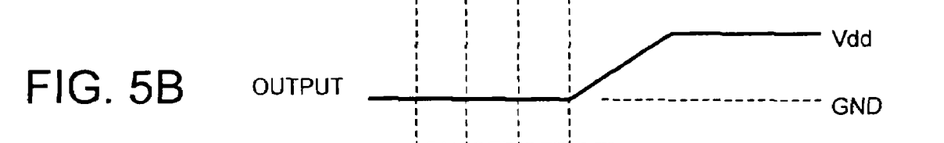
Figure 5C:
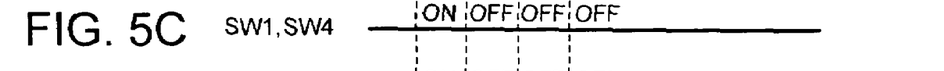
Figure 5D:
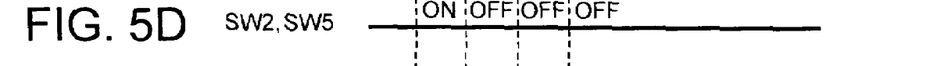
Figure 5E:
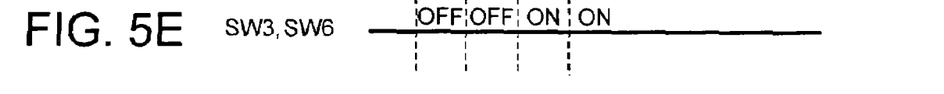
Figure 5F:
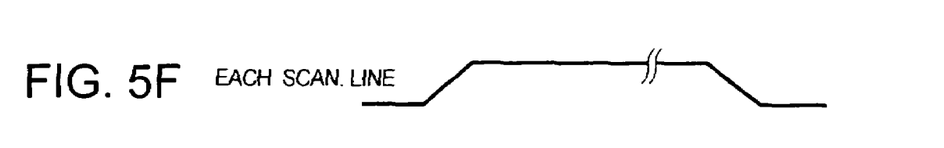

FIGS. 5A through 5E show operation timing charts of buffer circuit 130 shown in FIG. 4. FIGS. 5A and 5B show input (1) and output waveforms of buffer circuit 130. FIGS. 5C, 5D, and 5E show states of switches SW1 and SW4, SW2 and SW5, and SW3 and SW6, respectively. FIG. 5F shows a signal waveform supplied from buffer circuit 130 to each scanning line Ysc. The waveform of the scanning line on the side of the scanning line driver circuit is substantially the same as those at a middle of the scanning line and at the end terminal of the scanning line.

In order for constant current sources 133 and 134 to operate stably, period T1 is set as a voltage storage period (writing period or reset period) during which capacitors 136 and 138 of constant current sources 133 and 134 are charged with predetermined voltages, respectively. During that period T1 switches SW1, SW2, SW4, and SW5 are first turned on while switches SW3 and SW6 are turned off, and switches SW1 through SW6 are then turned off. Subsequently, switches SW3 and SW6 are turned on to become a waiting state. Here, when input (1) falls down, transistor 131 is turned on and transistor 132 is turned off. Since then constant current from constant current source 133 flows through transistor 131 so that the output rises up linearly from a low level to a high level, i.e., that with a constant rising slope waveform is obtained.

According to buffer circuit 130 shown in FIG. 4, since current from the constant current sources 133 and 134 flows with sufficient accuracy, operation dispersion due to transistor characteristics in the row direction is greatly mitigated. In other words, outputs of buffer circuits 130 are not substantially dispersed. As a result, line-like uneven brightness due to the gate (scanning) lines is visually reduced.

As set forth above, constant current lines 141 and 142 are connected to constant current sources 143 and 144, respectively. Constant current lines 141 and 142 each are commonly used for buffer circuits 130 of corresponding scanning lines. Thus, constant current sources 143 and 144 are commonly used to reset buffer circuits 130 connected to the scanning lines, and thus, reset conditions on buffer circuits 130 are not dispersed.

Figure 6:
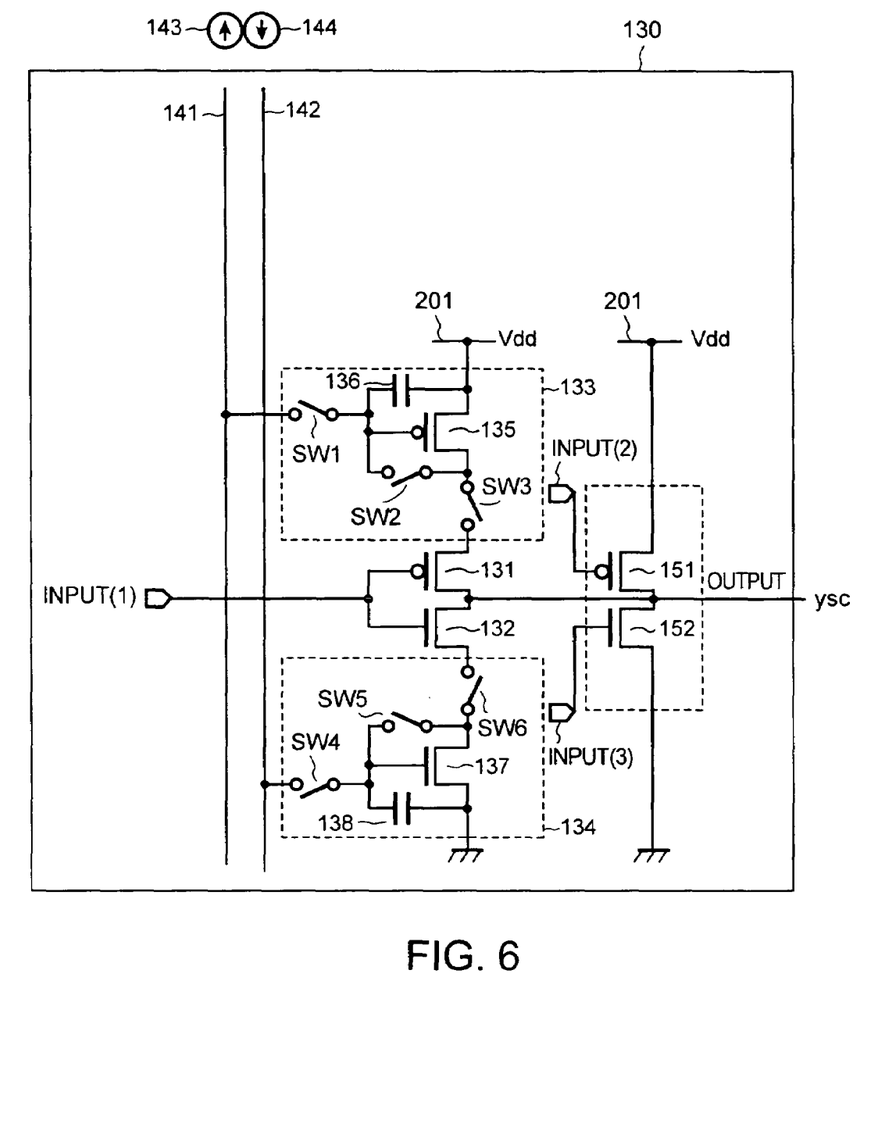
FIG. 6 is a circuit diagram of the third embodiment of the buffer circuits shown in FIG. 2.

FIG. 6 shows the third embodiment of buffer circuit 130 of the present invention. Since the same components as shown in FIG. 4 are indicated by the same reference numerals, their explanations are omitted. In the circuits shown in FIG. 6, the source electrode of n-channel transistor 132 connected to the drain electrode of p-channel transistor 131 is connected to the source electrode of n-channel transistor 152 connected to the drain electrode of p-channel transistor 151. The source electrode of p-channel transistor 151 is connected to voltage supply line 201 while the drain electrode of n-channel transistor 152 is connected to a reference potential. Inputs (2) and (3) are supplied to the gate electrodes of transistors 151 and 152, respectively.

Figure 7A:
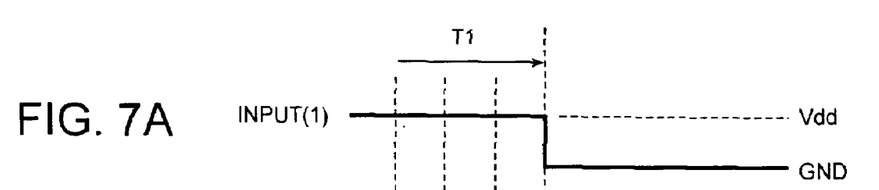
FIGS. 7A through 7G are timing charts to explain operations of the circuits shown in FIG. 6.
Figure 7B:
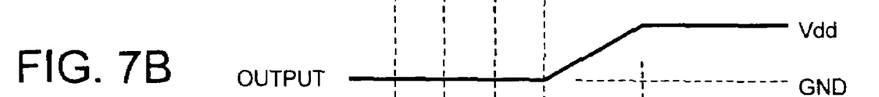
Figure 7C:
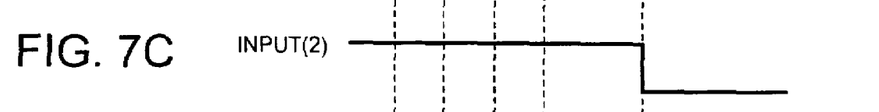
Figure 7D:
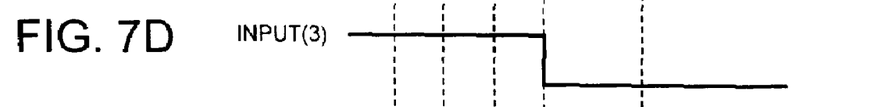
Figure 7E:
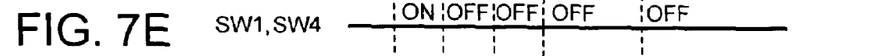
Figure 7F:
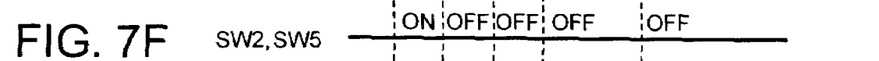
Figure 7G:
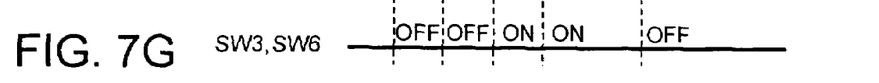

FIGS. 7A through 7G show operation timing charts of buffer circuit 130. FIGS. 7A and 7B show input (1) and an output on scanning line Ysc, respectively. FIGS. 7C and 7D show inputs (2) and (3), respectively. FIGS. 7E through 7G show states of switches SW1 through SW6.

Period T1 is a writing or reset period for capacitors 136 and 138 of constant current sources 133 and 134 to store predetermined voltages to make constant current sources 133 and 134 stably operate. During period T1, switches SW1, SW2, SW4 and SW5 are first turned on while switches SW3 and SW6 are turned off and all switches SW1 through SW6 are then turned off. Subsequently, switches SW3 and SW6 are turned on. At this time when input (1) falls down, transistors 131 and 132 are turned on and off, respectively. At the same time input (3) also falls down, transistor 152 is turned off and a constant current from constant current source 133 starts flowing through transistor 131 so that output (1) rises up from a low level to a high level to form a fixed slope. Output (1) is eventually maintained at constant voltage Vdd supplied from voltage supply line 201. In this way, during a writing (fixed slope) period, connecting switches (p-channel transistor 151 and n-channel transistor 152) make disconnect voltage supply source, and p-channel transistor 151 and n-channel transistor 152 connect voltage supply source after the fixed slope period. As a result, p-channel transistor 151 and n-channel transistor 152 prevent the outputs from floating.

Buffer circuit 130 is not limited to the embodiments with a combination of p-channel and n-channel transistors which form a fixed rise or fall slope output as set forth above. However, a circuit arrangement of p-channel transistors can be sufficiently used in the case that the circuit arrangement turns off the switching transistors of the driver circuits in the pixels in response to a rise-up signal of the scanning signal.

The descriptions above are primarily directed to a scanning line driver circuit, one scanning line and a buffer circuit that supplies the scanning line with an output (scanning signal) of the scanning line driver circuit. An active matrix type display apparatus, however, is actually provided with a plurality of scanning lines and buffer circuits that each supply their corresponding scanning lines with scanning signals from the scanning signal driver circuit.

Figure 8:
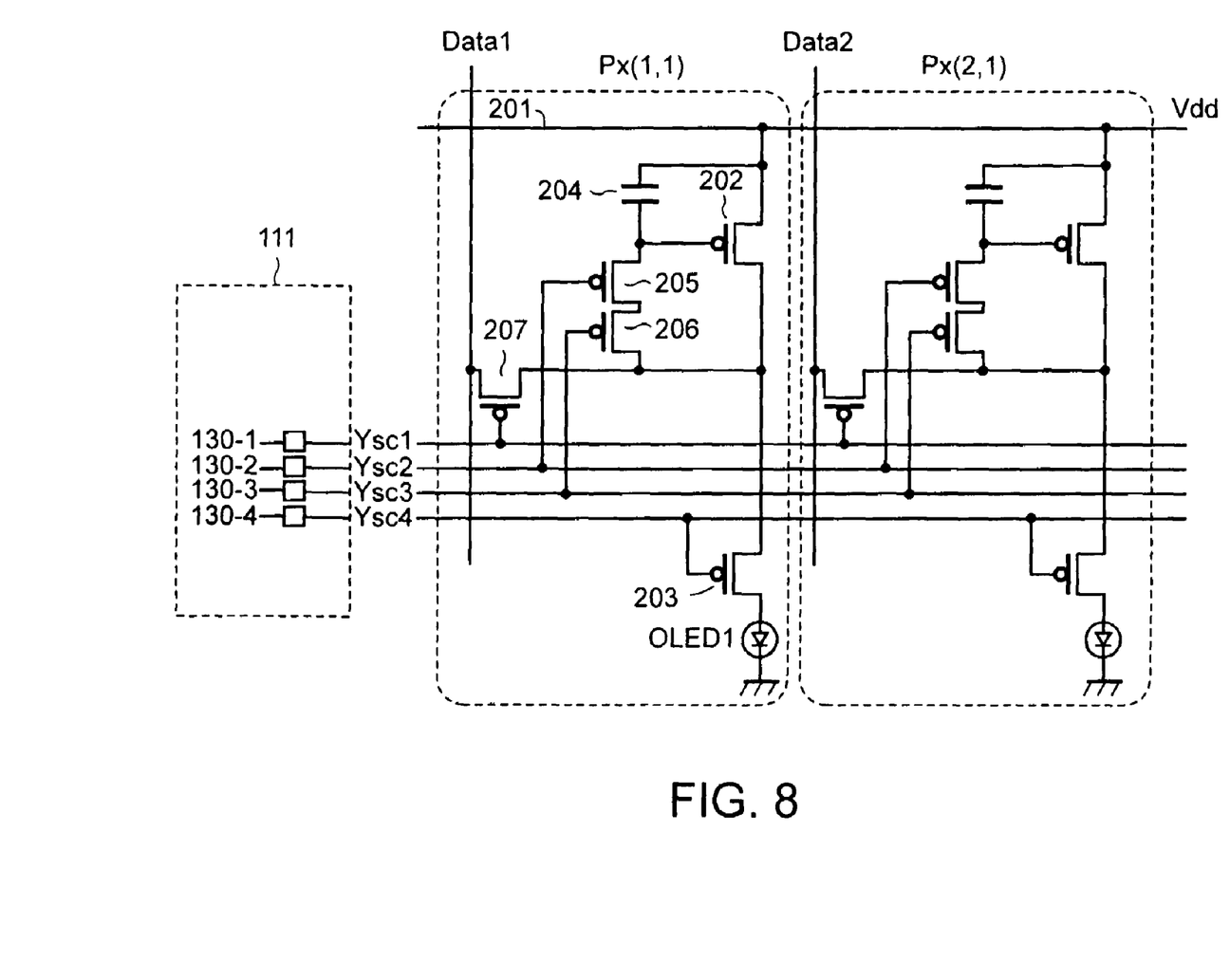
FIG. 8 is a circuit diagram of the pixel arrangement region of the first embodiment of the present invention.

FIG. 8 shows a representative circuit diagram of pixels Px (1,1) and Px (2,1) of pixel arrangement region 110 and scanning line driver circuits 111 shown in FIG. 1. Each pixel is provided with light-emitting display element OLED1, driver transistor 202, capacitor 204, switching transistors 205 and 206, pixel switching transistor 207 and switching (output) transistor 203. Voltage supply line 201 supplies constant voltage Vdd to the source electrode of driver transistor 202. Display element OLED1 is a light-emitting diode, such as an organic EL display element, to emit light in response to supplied current. Capacitor 204 is connected between the source and gate electrodes of driver transistor 202 and stores a potential difference between them corresponding to the input signal. A series circuit of switching transistors 205 and 206 is connected between the gate and drain electrodes of driver transistor 202. Driver transistor 202 supplies a driving current to display element OLED1 in response to an input signal supplied to a video input terminal. Pixel switching transistor 207 is connected between the drain electrode of driver transistor 202 and signal line Data 1 to supply video signals. Signal line Data 1 is driven by signal line driver circuit 112 shown in FIG. 1. Switching transistor 203 is connected between driver transistor 202 and the anode of display element OLED 1. The cathode of display element OLED 1 is connected to a reference voltage (or ground) line.

Gate electrodes of switching transistors 207, 205, 206 and 203 are connected to scanning lines Ysc1, Ysc2, Ysc3 and Ysc4 respectively. Scanning lines Ysc1, Ysc2, Ysc3 and Ysc4 are supplied with corresponding scanning signals from buffer circuits 130-1 through 130-4 in scanning line driver circuit 111 shown in FIG. 8, respectively. As described with reference to FIGS. 2 through 7, in particular, according to the present invention, the scanning signal of scanning line Ysc2 is outputted from buffer circuit 130-2.

Other pixels are the same in structure as pixel Px (1,1). Signal lines each, however, are connected to their corresponding pixels in column directions. Also, voltage supply lines 201 and scanning lines Ysc1 through Ysc4 each are connected to their corresponding pixels in row directions.

FIGS. 9A through 9D show operation timing charts of pixel Px (1,1) in response to current signals. At timing t1 of FIGS. 9A through 9D, scanning signals on scanning lines Ysc1, Ysc2 and Ysc3 are low in level and scanning signals on scanning line Ysc4 is high in level. Thus, switching transistors 207, 205 and 206 are turned on and output transistor 203 is turned off at timing t1. Driver transistor 202 becomes a diode state because switching transistors 205 and 206 are turned on. During a period from t1 to t2, the gate electrode of driver transistor 202 varies in potential in accordance with a video signal and capacitor 204 stores a voltage between the source and gate electrodes of driver transistor 202 corresponding to the video signal. That is, capacitor 204 accumulates charges in response to the video signal despite characteristics of driver transistor 202. The charges provide pixel Px(1,1) with brightness of the video signal.

During a next period from t3 to t4 capacitor 204 stably holds the accumulated or written charges. After timing t4, pixel switching transistor 207 is turned off and switching transistor 203 is turned on. During that period driver transistor 202 and capacitor 204 function as a stable current source to supply current to display element OLED1, which emits light. Current quantity (brightness) depends on the charges accumulated in capacitor 204 which set bias voltages between the source and gate electrodes of driver transistor 202.

Figure 9A:
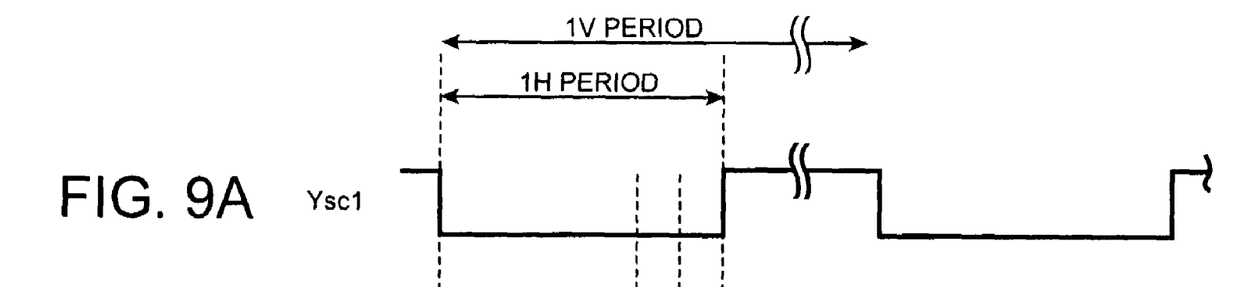
FIGS. 9A through 9D are timing charts to explain operations of the circuits shown in FIG. 8.
Figure 9B:
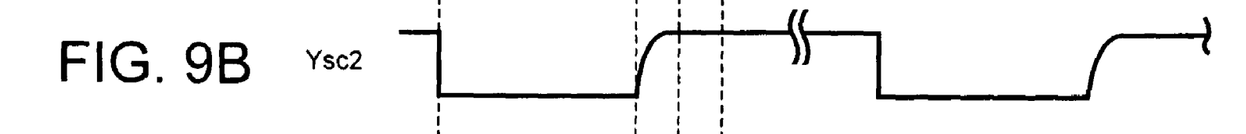
Figure 9C:
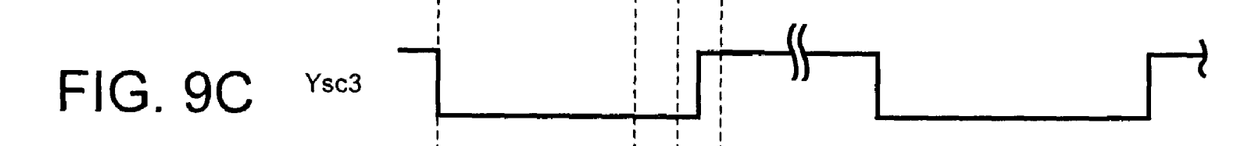
Figure 9D:
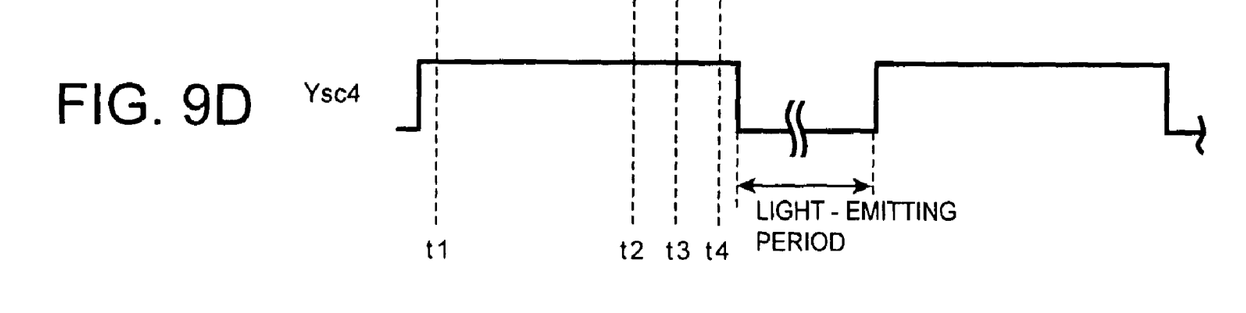

This circuit arrangement has technical features with respect to switching transistors 205 and 206 and a method for controlling them. As shown in FIGS. 9B and 9C, during a period from t2 to t3 switching transistor 205 is gradually turned off, and after timing t3 up to the end of one vertical (1V) period switching transistor 206 is turned off. Since switching transistor 205 is provided closest to the gate electrode of driver transistor 202 and is turned off earlier than other switching transistor in the series circuit of switching transistors 205, a feed-through (or punch-through) voltage quantity can be substantially reduced. This results in mitigation of an undesirable voltage fluctuation of driver transistor 202.

Further, since the gate electrode of switching transistor 205 closest to driver transistor 202 is controlled in response to a scanning signal adjusted to be a uniform waveform in a scanning line, a feed-through (or punch-through) voltage quantity can be substantially uniform in a panel region so that uniform display can be obtained with display dispersion suppressed.

In addition, when switching transistor 205 is made smaller in area, the feed-through (or punch-through) voltage quantity is further reduced. Further, when the channel of switching transistor 205 is configured to be smaller in area or longer in length than that of switching transistor 206, it also reduces a potential fluctuation at the gate electrode of driver transistor 202 so that uneven brightness (uneven display) as a display apparatus can be remarkably reduced.

In the embodiments described above, scanning lines for pixel switching transistor 207 and switching transistor 206 are controlled by the scanning signals supplied to the different scanning lines. The scanning lines can be used commonly for the switching transistors 206 and 207.

The present invention is not limited to a circuit arrangement of pixels driven by current signals but it is also applied to other circuit arrangements of pixels driven by voltage signals.

Figure 10:
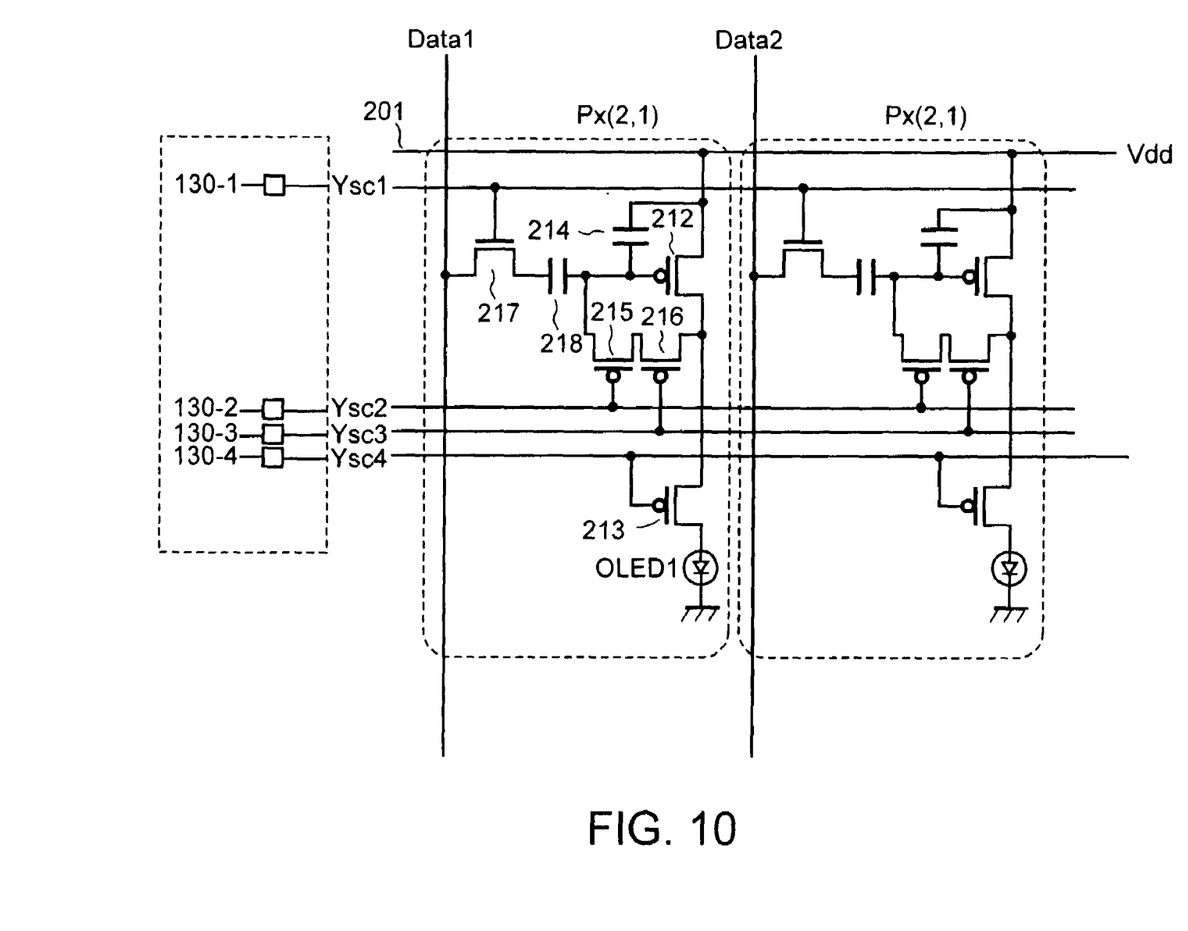
FIG. 10 is a circuit diagram of the pixel arrangement region of the second embodiment of the present invention.
Figure 11A:
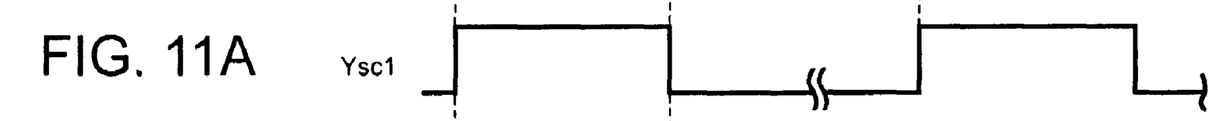
FIGS. 11A through 11D are timing charts to explain operations of the circuits shown in FIG. 10.
Figure 11B:
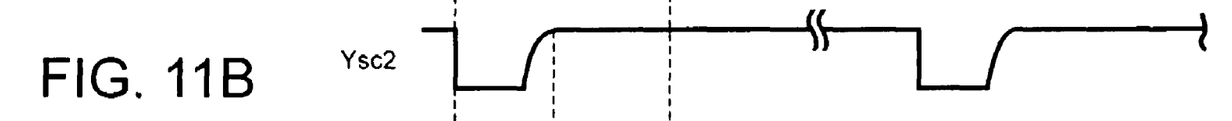
Figure 11C:
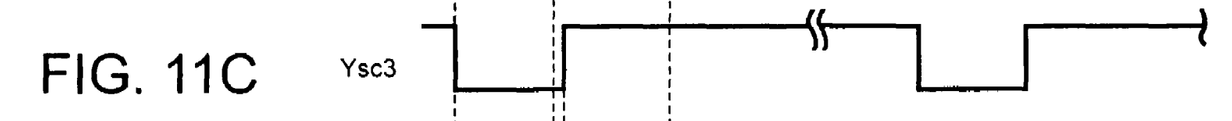
Figure 11D:
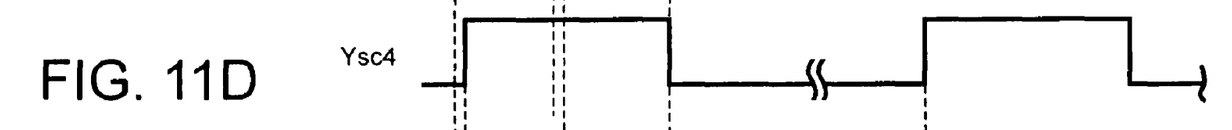

FIG. 10 is a circuit diagram of such a circuit arrangement of the pixels driven by voltage signals. The source electrode of driver transistor 212 is connected to voltage supply line 201. Capacitor 214 is connected between the source and gate electrodes of driver transistor 212. A series circuit of switching transistors 215 and 216 are connected between the gate and drain electrodes of driver transistor 212. The gate electrode of driver transistor 212 is connected to the source electrode of pixel switching transistor 217 through capacitor 218. The drain electrode of switching transistor 217 is connected to signal line Data1. The drain electrode of driver transistor 212 is connected to the anode electrode of display element OLED1 through switching (output) transistor 213. The cathode of display element OLED1 is connected to a reference (or ground) potential line.

The gate electrodes of pixel switching transistor 217, first and second switching transistors 215 and 216 and output transistor 213 are connected to scanning lines Ysc1, Ysc2, Ysc3 and Ysc4, respectively. Switching transistor 217 is a n-channel TFT.

FIGS. 11A through 11D show operation timing charts of the pixels in the organic EL display apparatus shown in FIG. 10. The organic EL display apparatus provided with a threshold cancel type voltage driven circuit makes a turned-on output transistor of a given pixel turned-off to enable the pixel to display images (reset period). During a subsequent threshold voltage Vth cancel period, switching transistor 215 and 216 are turned on in response to scanning signals on scanning lines Ysc2 and Ysc3 while output transistor 213 is turned-off in response to a scanning signal on scanning line Ysc4. Thus, capacitors 214 and 218 are charged until current does not flow through the source and drain electrodes of driver transistor 212. In this state, since the gate and drain electrodes of driver transistor 212 are connected through switching transistors 215 and 216, a gate potential of driver transistor 212 becomes threshold Vth. During this period, a scanning signal on scanning line Ysc1 makes pixel switching transistor 217 turned on and signal line driver circuit 112 supplies signal line Data1 with reset signal Vrst.

During a writing period after the operations described above, switching transistors 215 and 216 are turned off in response to scanning signals supplied to scanning lines Ysc2 and Ysc3 and video signal Vsig is supplied from signal line driver circuit 112 to signal line Data 1. As a result, the gate electrode of driver transistor 212 changes in potential difference between reset signal Vrst and video signal Vsig with respect to threshold voltage Vth. During a next light-emitting period, pixel switching transistor 217 is turned off and output transistor 213 are turned on. As a result, driving current in accordance with such potential difference at the gate electrode of driver transistor 212 is supplied from voltage supply line 201 to organic EL display element OELD1 through driver transistor 212 and output transistor 213.

The feed-through (punch-through) voltage reduces in potential fluctuations at the gate electrode of switching transistor 212 when transistor 215 is turned off. As seen from FIGS. 10 and 11, however, since the series circuit of transistors 215 and 216 is connected between the gate and drain electrodes of driver transistor 212 and since transistor 215 which is closer to the gate electrode is earlier turned off than transistor 216, such potential fluctuations quantity can be significantly reduced. Further, at least scanning signals of switching transistors 215 supplied to scanning line Ysc2 are adjusted to be substantially the same in shape despite locations of the scanning line, the same effect as previously described in the embodiments can be obtained.

The present invention is carried out by both current signal and voltage signal driven methods. Either amorphous or poly crystalline silicon semiconductor devices can be used for the circuit components.

The circuit arrangement in FIG. 10 includes the buffer circuit already described and has substantially the same scanning waveforms on the driver circuit side, middle side of the wiring (scanning line) and end terminal side of the wiring (scanning line). Operations incorporated with switching transistors 215 and 216 assure stable scanning methods to substantially reduce uneven display.

Figure 12:
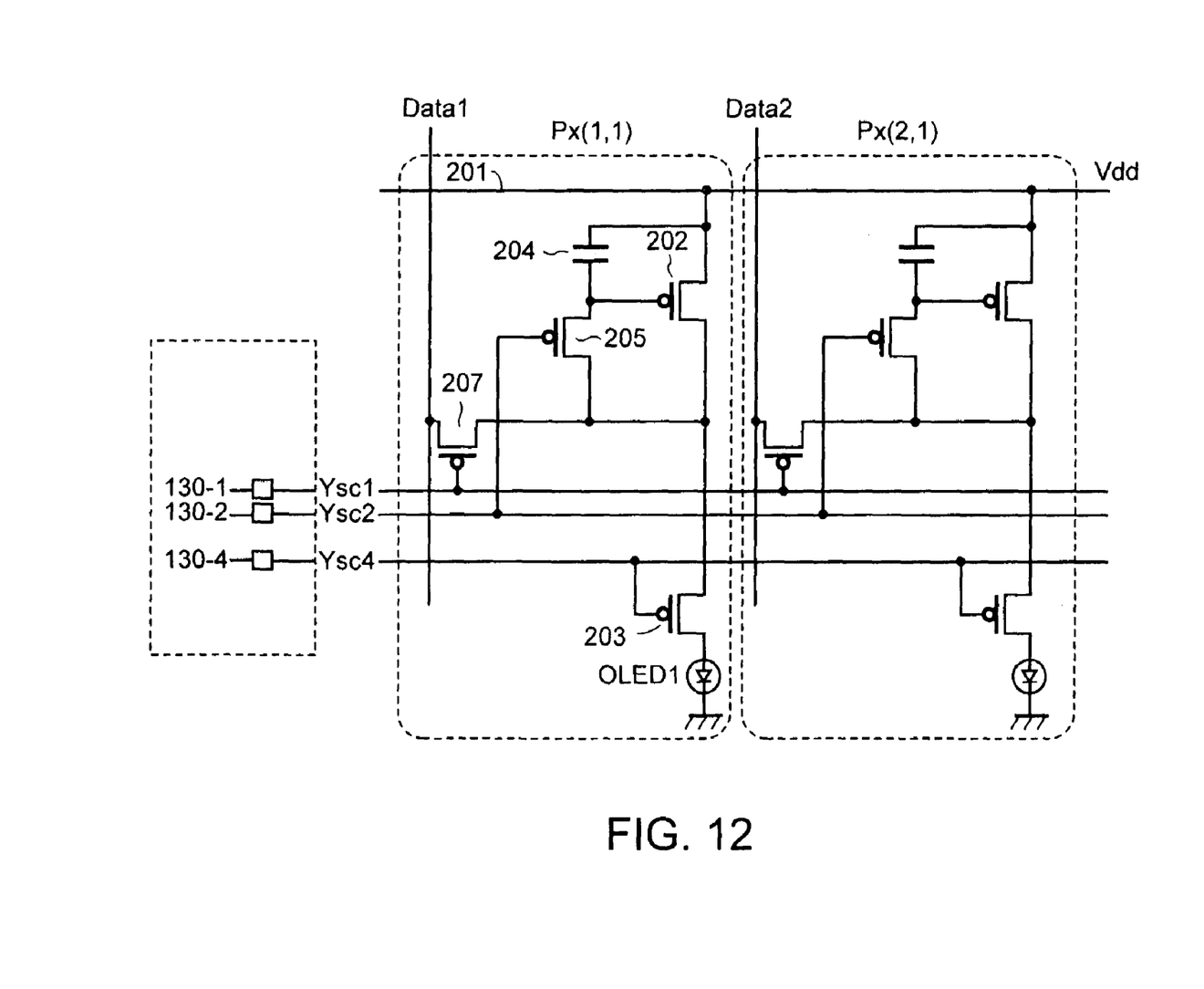
FIG. 12 is a circuit arrangement of the pixel arrangement region of the third embodiment of the present invention.
Figure 13:
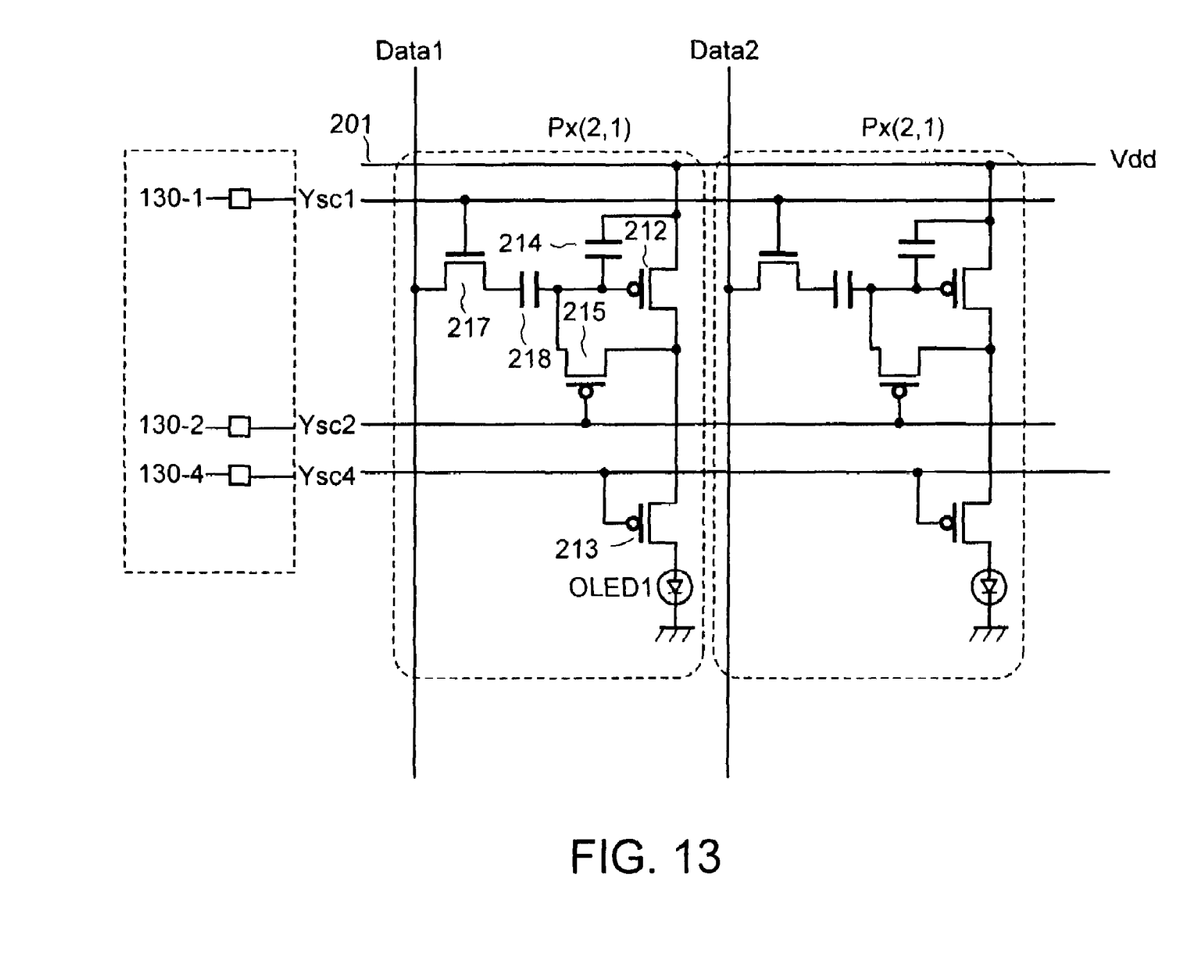
FIG. 13 is a circuit arrangement of the pixel arrangement region of the fourth embodiment of the present invention.

The present invention is not limited to the embodiments described above but it may be of the structures shown in FIGS. 12 and 13. In comparison with those shown in FIGS. 8 and 10 switching transistors 206 and 216 and scanning line Ysc3 are omitted from the structures shown in FIGS. 12 and 13 but the other components are the same in structure as shown in FIGS. 8 and 10. The circuit arrangement shown in FIGS. 12 and 13 includes substantially the same buffer circuits so that scanning waveforms of scanning line Ysc2 are substantially the same on the driver circuit side, middle side of the wiring (scanning line) and end terminal side of the wiring (scanning line).

The embodiments set forth above are provided with the scanning line driver circuit on one terminal side but each scanning line may be provided with scanning line driver circuits at both end terminals. In that case, however, the "driver circuit side" means the side close to outputs of the scanning line driver circuits, the "end terminal side of the scanning line" means an equal distance position side from the scanning line driver circuits, i.e., between and equidistant from two scanning line driver circuits, and the "middle side of the scanning line" means a middle position side between the scanning line driver circuit and the equal distance position.

According to the present invention, substantially uniform waveforms are supplied to any locations of a scanning line so that good display quality can be obtained.

Although the invention has been described in its preferred form with a certain degree of particularity, it is understood that the present disclosure of the preferred form has been changed in the details of construction and the combination and arrangement of components may be resorted to without departing from the spirit and the scope of the invention as hereinafter claimed. Some components of the embodiments may be eliminated or various components from different embodiments may also be combined.

TERM LIST

110: pixel arrangement region
111: scanning line driver circuit
112: signal line driver circuit
113: controller
130: buffer circuit
130-1: buffer circuit
130-2: buffer circuit
130-3: buffer circuit
130-4: buffer circuit
131: p-channel thin film transistor (p-channel tft)
132: n-channel thin film transistor (n-channel tft)
133: constant current source
134: constant current source
135: p-channel transistor 135
136: capacitor
137: n-channel transistor
138: capacitor
140: input terminal
141: constant current line
142: constant current line
143: constant current source
144: constant current source
151: p-channel transistor
152: n-channel transistor
201: voltage supply line
202: driver transistor
203: switching (output) transistor
204: capacitor
205: switching transistor
206: switching transistor
207: pixel switching transistor
212: driver transistor
213: switching (output) transistor
214: capacitor
215: switching transistor
216: switching transistor
217: pixel switching transistor
218: capacitor
Px (1, 1): pixel at coordinate (1, 1)
Px (2, 1): pixel at coordinate (2, 1)
Px (n, m): pixel at coordinate (n, m)
Data1: signal line
Data2: signal line
Vdd: supply voltage
Ysc1-Ysc4: scanning lines
SW1-SW6: switches
OLED1: display element

What is claimed is:

1. An active matrix type display apparatus, comprising:
display elements operated in response to a driving current;
driver transistors for supplying the driving current to said display elements in accordance with input signals;
capacitors each connected to gate electrodes of said driver transistors for storing potential differences between source and gate electrodes of said driver transistors;
switches connected between the gate and drain electrodes of said driver transistors;
scanning lines connected to said switches;
a scanning line driver circuit; and
buffer circuits connected between said scanning line driver circuit and said scanning lines to supply the scanning signals to said switches,
wherein said buffer circuits are configured to make transient time of waveforms at output terminals of said buffer circuits from one state of the scanning signals to another state substantially the same as that at end terminals of said scanning lines when said switches shifts from its turned-on state to its turned-off state.

2. An active matrix type display apparatus, comprising:
a pixel arrangement region including scanning lines and signal lines crossing said scanning lines at substantially right angles;
pixels disposed at vicinities of crossing points of said scanning lines and said signal lines;
a scanning line driving circuit provided to supply scanning signals to said scanning lines;
a signal line driver circuit provided to supply signals to said signal lines; and
buffer circuits provided between said scanning lines and said scanning line driver circuit,
wherein said buffer circuits each are configured to make rise or fall time of said scanning signals at output sides of said buffer circuits substantially the same as or longer than that of said scanning signals at end terminals of said scanning lines when the scanning signals supplied to said scanning lines are rectangular in waveform.

3. An active matrix type display apparatus according to claim 2, wherein said buffer circuits include a constant current source for supplying outputs of said scanning signals with linear slope waveforms.

4. An active matrix type display apparatus according to claim 3, wherein said buffer circuits include a constant current source for supplying outputs of said scanning signals with linear slope waveforms and an output of said buffer circuits are connected to a constant voltage circuit to stabilize output voltages of said scanning signals.

5. An active matrix type display apparatus, comprising:
a pixel arrangement region including scanning lines and signal lines crossing said scanning lines at substantially right angles;
pixels disposed at vicinities of crossing points of said scanning lines and said signal lines;
a power source line;
driver transistors connected to said power source line through source electrodes thereof;
capacitors connected to gate electrodes of said driver transistors;
first and second switching transistors connected in series between said gate electrodes and drain electrodes of said driver transistors;
pixel switches for supplying signals from said signal lines to said gate electrodes of said driver transistors;
third switching transistors connected to said drain electrodes of said driver transistors;
light-emitting diodes connected between said third switching transistors and a reference potential;
a scanning line driving circuit provided to supply scanning signals to said scanning lines;
a signal line driver circuit provided to supply signals to said signal lines; and
buffer circuits provided between said scanning lines and said scanning line driver circuits,
wherein said buffer circuits each are configured to make rise or fall time of said scanning signals at output sides of said buffer circuits substantially the same as or longer than that of said scanning signals at end terminals of said scanning lines when the scanning signals supplied to said scanning lines are rectangular in waveform.

6. An active matrix type display apparatus, comprising:
a pixel arrangement region including scanning lines and signal lines crossing said scanning lines at substantially right angles;
pixels disposed at vicinities of crossing points of said scanning lines and said signal lines;
a power source line;
driver transistors connected to said power source line through source electrodes thereof;
capacitors connected between said source electrodes and gate electrodes of said driver transistors;
first and second switching transistors connected in series between said gate electrodes and drain electrodes of said driver transistors;
pixel switches for supplying signals from said signal lines to said gate electrodes of said driver transistors;
third switching transistors connected to said drain electrodes of said driver transistors;
first through fourth scanning lines provided to supply scanning signals to switch said first through third switching transistors and said pixel switches;
light-emitting diodes connected between said third switching transistors and a reference potential;
a scanning line driving circuit provided to supply scanning signals to said scanning lines;
a signal line driver circuit provided to supply signals to said signal lines; and
buffer circuits provided between said scanning lines and said scanning line driver circuit,
wherein said buffer circuits each are configured to make rise or fall time of said scanning signals at output sides of said buffer circuits substantially the same as or longer than that of said scanning signals at end terminals of said scanning lines when the scanning signals supplied to said scanning lines are rectangular in waveform.

* * * * *